No. 726,606. PATENTED APR. 28, 1903.
G. WILSON.
HORSE HAY RAKE.
APPLICATION FILED AUG. 31, 1901.
NO MODEL. 2 SHEETS—SHEET 2.
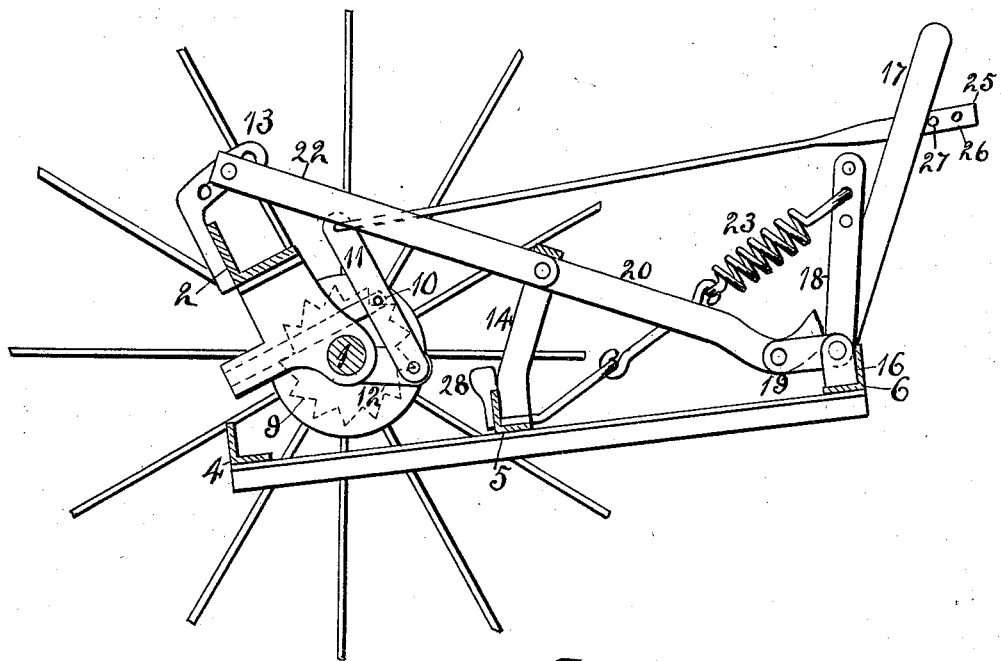
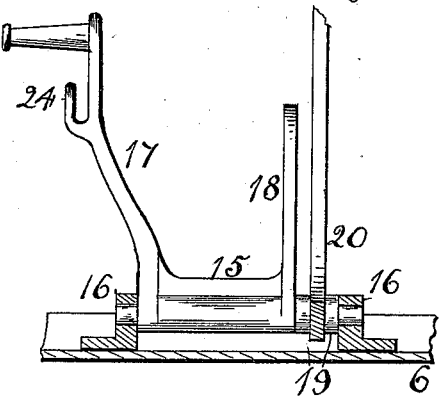

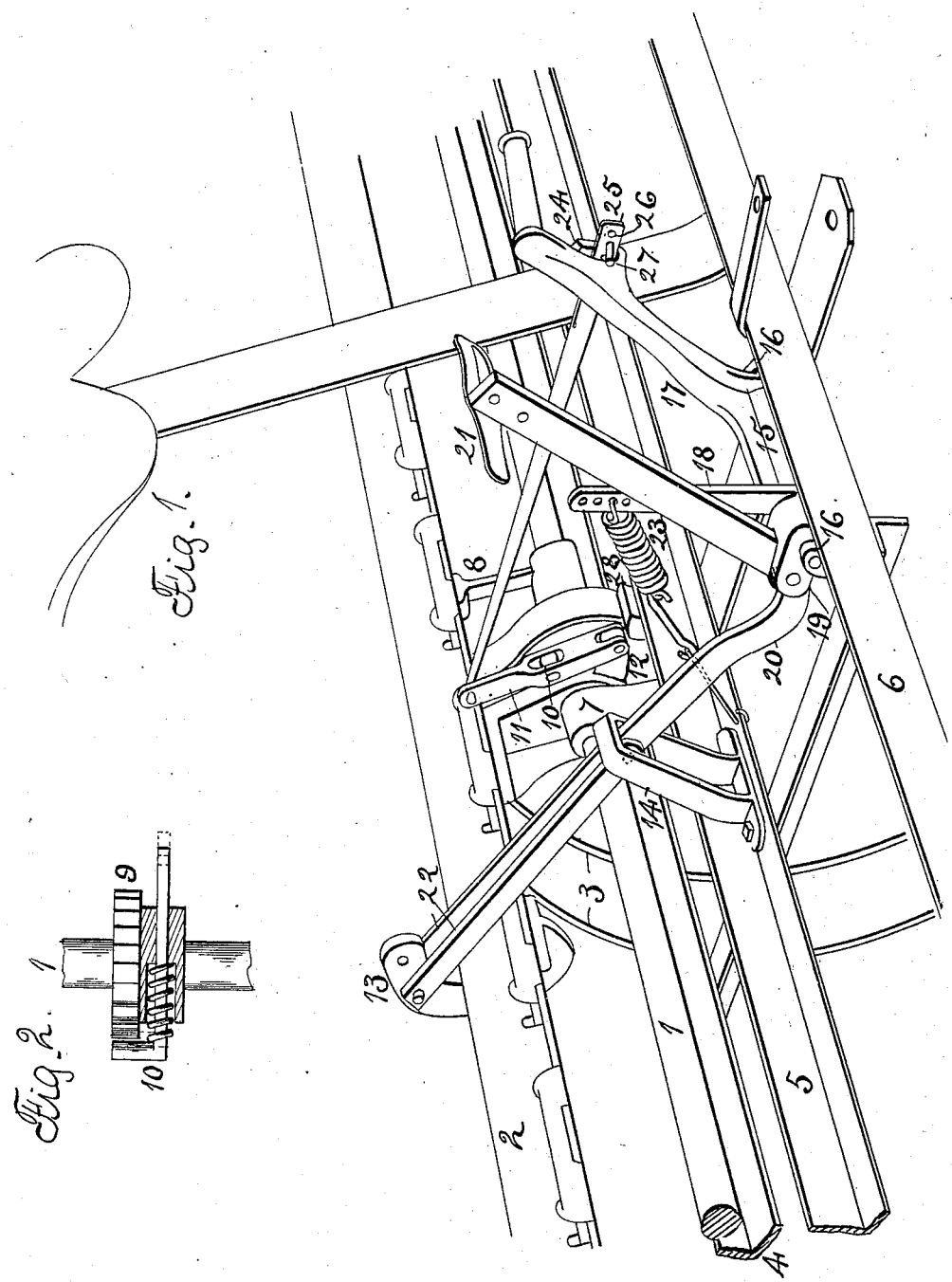

UNITED STATES PATENT OFFICE.

GEORGE WILSON, OF ROCKFORD, ILLINOIS, ASSIGNOR TO EMERSON MANUFACTURING COMPANY, OF ROCKFORD, ILLINOIS.

HORSE HAY-RAKE.

SPECIFICATION forming part of Letters Patent No. 726,606, dated April 28, 1903.

Application filed August 31, 1901. Serial No. 74,032. (No model.)

*To all whom it may concern:*

Be it known that I, GEORGE WILSON, a citizen of the United States, residing at Rockford, in the county of Winnebago and State of Illinois, have invented certain new and useful Improvements in Horse Hay-Rakes, of which the following is a specification.

This invention relates to a class of horse hay-rakes in which the teeth are held down in working position, and just after they are released a connection is formed between the revolving axle and rake-head in order that the teeth may be raised to dump the load.

In the accompanying drawings, Figure 1 is a perspective view of the operative parts of my improved horse hay-rake. Fig. 2 is a horizontal section of the clutch connection between the rake-head and axle. Fig. 3 is a transverse section showing the several parts in working position. Fig. 4 is a lengthwise section showing the rock-shaft and its connections.

The framework of my improved horse hay-rake is old and comprises the axle 1, rake-head 2, rake-teeth 3, and the lengthwise angle-bars 4, 5, and 6, forming the tongue and seat-supporting frame, which is pivotally supported by the axle, by the bracket 7, and other brackets. (Not shown.) The rake-head 2 is pivotally supported by the axle, by the bracket 8, and other brackets. (Not shown.) To the axle is secured a ratchet-wheel 9. A dog 10 has a pivotal connection at one end with a lever 11, and the lever has a pivotal connection with the bracket 12. To the rake-head is secured a bracket 13, having a series of holes. To the angle-bar 5 is secured a loop 14. A rock-shaft 15 is pivotally supported by the brackets 16 and has a foot-lever 17 formed therewith, also a vertical arm 18, provided with a series of holes. One end of this rock-shaft has two perforated lugs 19, between which is pivoted an angle-lever 20. One end of the lever has a foot-rest 21 secured thereto, and the other end of the lever has a pivotal connection with the bars 22, and the other ends of the bars have a pivotal connection with the bracket 13. The point of connection between the bar 20 and bars 22 is located within the loop 14. A spring 23 has one end connected with the arm 18 and the other end with the angle-bar 5. The foot-lever 17 is provided with a hook 24, within which is located one end of a rod 25. The other end of this rod has a connection with the arm 11 of the clutch mechanism. The rod 25 is provided with a series of holes 26, and a pin 27 is located in one of the holes. The axle revolves with the supporting-wheels, and the ratchet-wheel revolves with it. When the teeth are in working position, the pivotal point between the bar 20 and the bars 22 is above a line drawn between the pivotal point of the connection of the bars 22 with the bracket 13 and the pivotal point of the bar 20 with the ears 19, the loop 14 limiting the upward movement of the bars, thereby forming a lock between the rake-head and the tongue-frame. By means of the foot-rest 21 the bars can be brought and held into lock. When it is desired to dump the rake, the driver rocks the shaft 15 by pressing on the foot-lever 17. The movement will first raise the pivot-point of the arm 20 in its connection with the ears 19 above a line drawn through the pivot of the lever with the arms 22 and the pivot of the arms with the bracket 13, which will break the lock connection between the rake-head and tongue-supporting frame. A further movement of the foot-lever will draw on the rod 25, which will move the dog 10 into engagement with the ratchet, thereby forming a connection between the rake-head and axle, and the rotary movement of the axle will raise the rake-head and release the load. When the arm 11 comes in contact with the stop 28, the dog will be forced from its engagement with the ratchet-wheel, thereby liberating the rake-head and allowing it to drop and cause the arms to lock the rake-head down. The spring 23 exerting its force on the arm 18 will hold the pivotal point of the lever 20 in connection with the ears 19, so as to produce the lock, as before described.

I claim as my invention—

1. In a horse hay-rake, the combination of an axle, a rake-head, a rock-shaft, a double link connection between the rake-head and rock-shaft, a stop limiting the upward movement of the link connection, means for breaking the lock of the link connection by raising one end thereof, a clutch connection between the axle and rake-head and a connection between the rock-shaft and clutch mechanism.

2. In a horse hay-rake, the combination of an axle, a rake-head, a rock-shaft, a double link connection between the rock-shaft and rake-head, a clutch connection between the axle and rake-head, and a connection between the rock-shaft and clutch connection.

3. In a horse hay-rake, the combination of an axle, a rake-head, a rock-shaft, a double link connection between the rock-shaft and rake-head, a clutch connection between the axle and rake-head, a connection between the rock-shaft and clutch connection, and a spring connection between the rock-shaft and stationary support.

GEORGE WILSON.

Witnesses:
A. O. BEHEL,
E. BEHEL.